(12) United States Patent
Tian et al.

(10) Patent No.: US 12,492,603 B1
(45) Date of Patent: Dec. 9, 2025

(54) INTELLIGENT IMPACT CASING RESHAPING TOOL

(71) Applicants: Southwest Petroleum University, Chengdu (CN); Sichuan Xieming Technology Co., Ltd., Chengdu (CN); Zhejiang Huizuan Technology Co., Ltd., Huzhou (CN)

(72) Inventors: Jialin Tian, Chengdu (CN); Jianping Shen, Chengdu (CN); Lin Yang, Chengdu (CN); Deyu Zhu, Chengdu (CN); Xin Li, Chengdu (CN); Jiewen Zhu, Chengdu (CN)

(73) Assignees: SOUTHWEST PETROLEUM UNIVERSITY, Chengdu (CN); SICHUAN XIEMING TECHNOLOGY CO., LTD., Chengdu (CN); ZHEJIANG HUIZAN TECHNOLOGY CO., LTD., Huzhou (CN)

( * ) Notice: Subject to any disclaimer, the term of this patent is extended or adjusted under 35 U.S.C. 154(b) by 0 days.

(21) Appl. No.: 19/031,188

(22) Filed: Jan. 17, 2025

(30) Foreign Application Priority Data

Jan. 13, 2025 (CN) .......................... 202510048522.7

(51) Int. Cl.
*E21B 29/10* (2006.01)
(52) U.S. Cl.
CPC .................... *E21B 29/10* (2013.01)

(58) Field of Classification Search
CPC ...................................................... E21B 29/10
See application file for complete search history.

(56) References Cited

U.S. PATENT DOCUMENTS

| | | | | |
|---|---|---|---|---|
| 958,517 | A | * | 5/1910 | Mettler .................. E21B 29/10 72/122 |
| 2,627,891 | A | * | 2/1953 | Clark ..................... E21B 29/10 72/119 |
| 4,509,885 | A | * | 4/1985 | Dickinson ............. B24B 39/023 29/90.01 |
| 7,159,435 | B2 | * | 1/2007 | Feldmann ................ B21D 3/00 72/20.1 |

* cited by examiner

*Primary Examiner* — D. Andrews
(74) *Attorney, Agent, or Firm* — Central California IP Group, P.C.; Andrew D. Fortney (57) ABSTRACT

An intelligent impact casing shaping tool in the field of deformation casing shaping and repair is disclosed. It includes a power module, a detection module, and a repair module. The power module generates power through rotation of a turbine, while the detection module sends pipe wall information to a ground receiving device in real-time. When pipe wall defects are detected, repair operations can be done by increasing the flow rate of the drilling fluid. As the flow rate increases, a clutch unit in the repair module engages with a power disk by centrifugal force of a centrifugal block, transmitting power to a cam seat. When the cam seat rotates, the cam engages with a roller, lifting an impact hammer. As the roller descends, an impact spring releases energy, and a repair push block strikes the deformed area, repairing the deformed casing.

20 Claims, 6 Drawing Sheets

INTELLIGENT IMPACT CASING RESHAPING TOOL

CROSS-REFERENCE TO RELATED APPLICATIONS

This application claims the benefit of Chinese Pat. Appl. No. 202510048522.7, filed on Jan. 13, 2025, incorporated herein by reference as if fully set forth herein.

TECHNICAL FIELD

This invention is applicable to the field of deformed casing reshaping and repair, specifically relating to an intelligent impact casing reshaping tool.

BACKGROUND OF THE INVENTION

Casing deformation is a common issue during oil drilling processes and can pose serious hazards to downhole operations. Casing deformation is usually caused by factors such as pressure imbalances, formation movement, and wellbore collapse. When casing deformation occurs, it obstructs the passage of drilling tools, making it impossible to carry out drilling or other downhole operations smoothly. Additionally, casing deformation can compromise the integrity of the wellbore seal, leading to oil and gas leaks, increasing the risk of blowouts, and threatening on-site safety. Furthermore, casing deformation can also affect subsequent oil extraction processes, reducing the lifespan of the well.

SUMMARY OF THE INVENTION

The purpose of this invention is to propose an intelligent impact casing reshaping tool to solve the problems mentioned in the background. The tool collects information about the pipe wall through a detection unit, and the control unit transmits the collected information to a ground terminal. If any deformation is detected, ground personnel can increase the drilling fluid flow rate to activate the impact module, enabling the repair of the deformed casing.

To address the above problems, the technical solution adopted by this invention is as follows: The intelligent casing reshaping tool includes a power module, a repair module, and a detection module.

The power module comprises an upper joint, a power housing, a guide ring, a guide wheel shaft, a guide wheel, a guide wheel thrust bearing, a turbine, a power shaft, a bearing end cover, a guide tube thrust bearing, a positioning pin, a guide tube, a transmission shaft, and a guide plate. The upper joint is connected to the power housing by threads (e.g., a threaded or screw-type connector). The guide ring is threaded into an inner wall of the power housing, diverting a drilling fluid (e.g., flowing in from above). The guide ring, the guide wheel shaft, and the guide wheel are sequentially linked by threads (e.g., threaded or screw-type connectors), with a spiral direction (e.g., of the threaded or screw-type connectors) opposite to that of a rotation of the turbine. A lower end of the guide wheel is positioned by a shaft retaining ring, which alters the flow path of the drilling fluid. The drilling fluid drives the rotation of the turbine, which is connected at a lower end of the guide wheel shaft. A guide wheel thrust bearing is at the connection between the turbine and guide wheel shaft. The power shaft is connected to a lower end of the turbine via a spline, and the guide tube is connected to the power housing via the positioning pin. The bearing end cover and the guide tube thrust bearing are between the guide tube and power shaft (e.g., in sequence). The transmission shaft is connected to a lower end of the power shaft by threads (e.g., a threaded or screw-type connector). The guide plate fits with or to the transmission shaft by an interference fit, and an axial position (e.g., of the guide plate) may be determined by a turntable. The guide plate may gather the drilling fluid (e.g., flowing in from above) and/or allow it to enter the transmission shaft through one or more (e.g., four) transmission shaft flow channels, which may be evenly distributed (e.g., around the guide plate and/or the transmission shaft).

The repair module consists of or comprises a turntable, a centrifugal spring, a centrifugal block, a ball bearing (e.g., a deep groove ball bearing), a power plate, a spline sleeve, a mandrel, a roller seat, a roller, a cam, a cam seat, an impact housing, a thrust ball bearing, a bearing seat, an impact shaft, an impact spring, an impact hammer, a push block spring, a repair push block, and a cleaning shaft. The turntable is connected to the transmission shaft by threads (e.g., a threaded or screw-type connector). The centrifugal block is connected to a hinge seat (e.g., a surface thereof) of the turntable via a cylindrical pin, and the centrifugal spring is connected to the centrifugal block (e.g., a surface thereof) with a spring buckle. The ball bearing is in a deep groove between the power plate and turntable. An upper surface of the power plate includes (e.g., is fitted with) a centrifugal block buckle. The spline sleeve is connected to the power plate and to the cam seat via splines. The mandrel is connected to the power plate by threads (e.g., a threaded or screw-type connector), and the cam is connected to the cam seat by threads (e.g., a threaded or screw-type connector). The roller is connected to the roller seat by bolts (e.g., a plurality of bolt-and-nut or bolt-and-threaded hole connectors), and the roller may fit to or with a surface track of the cam. The roller seat is connected to the impact shaft by threads (e.g., a threaded or screw-type connector), and the impact housing is connected to the power housing by threads (e.g., a threaded or screw-type connector). The bearing seat is connected to the impact housing by threads (e.g., a threaded or screw-type connector). The thrust ball bearing is in the bearing seat, making contact with a lower surface of the cam seat. There is a clearance fit between the impact shaft and the bearing seat, and the impact hammer is connected to the impact shaft by threads (e.g., a threaded or screw-type connector). The impact spring is between the impact hammer and the bearing seat. The repair push block is in a push block slot or opening on or in the impact housing (or a surface thereof), and four repair push blocks may be evenly distributed around it (e.g., the impact housing). Surfaces of the repair push block(s) and the inner wall of the impact housing may each independently include one or more spring grooves or holes. The push block spring is between or in the spring groove of the repair push block and/or the spring groove of the impact housing, and two push block springs may be grouped together (e.g., in a set for a corresponding one of the repair push blocks), and four groups or sets of push block springs may be evenly distributed around it (e.g., the impact housing). The cleaning shaft is connected to the impact housing by threads (e.g., a threaded or screw-type connector), and there is a clearance fit between the cleaning shaft and the impact hammer. The cleaning shaft features cleaning flow channels (e.g., six [6] cleaning flow channels), evenly distributed around it (e.g., the cleaning shaft), aligned with a center of the impact housing flow channel. When the drilling fluid is at a low flow rate, the turntable may rotate slowly, and a centrifugal force generated by the centrifugal block may be insufficient to overcome the pull of the centrifugal spring, preventing the centrifugal block from engaging with the centrifugal block buckle. Consequently, power cannot be transmitted to the spline sleeve, and the impact hammer remains in an initial position. The drilling fluid flows through the cleaning shaft flow channel(s) to clean a pipe wall (e.g., as described herein), allowing the detection unit to collect pipe wall information. When the drilling fluid flow rate increases, the turbine speed rises, the turntable speed increases, and the centrifugal block, under the influence of centrifugal force, stretches the centrifugal spring. The centrifugal block then engages with the centrifugal block buckle, transmitting power to the spline sleeve, which rotates the cam seat, causing the impact hammer to operate or begin operation.

The detection module includes a control seat, a control unit, a battery pack, a detection unit, and anti-collision glass. The control seat is connected to the impact housing by threads (e.g., a threaded or screw-type connector), and may include four control seat wire holes uniformly arranged around it. The control seat wire holes are concentric with the impact housing wire holes. The control unit is connected to the control seat by bolts (e.g., a plurality of bolt-and-nut or bolt-and-threaded hole connectors) and includes an MCU and a wireless signal transmission chip, and optionally a DC-DC step-down circuit, a power filtering circuit, a signal filtering circuit, and a signal amplification circuit, all of which may be integrated on a printed circuit board (PCB). The battery pack is connected to the control seat by bolts (e.g., a plurality of bolt-and-nut or bolt-and-threaded hole connectors) and connected to the control unit by wires. The detection unit is in a notch or recess in the impact housing, and may include four evenly distributed units. The detection unit comprises a camera and a supplemental light, optionally at an angle of 30° to an axis (e.g., the central axis) of the tool, which preferably positions the camera's field of view in front of or at the front end of the repair push block. The supplemental light can illuminate the pipe wall, facilitating collection of pipe wall information by the camera. The detection unit connects to the control unit and battery pack via wires (e.g., through the control seat wire holes and impact housing wire holes). The anti-collision glass is connected to the impact housing by bolts (e.g., a plurality of bolt-and-nut or bolt-and-threaded hole connectors), and may comprise four evenly distributed anti-collision glass sections. The anti-collision glass or sections thereof may cover a corresponding one of the notches or recesses in the impact housing containing the camera and the supplemental light. The pipe wall information collected by the detection unit is transmitted to the ground terminal via the control unit. Ground personnel can control the tool's operating status by increasing or decreasing the drilling fluid flow rate based on the pipe wall information.

In some embodiments, the intelligent impact casing shaping tool further comprises lubrication oil between the guide wheel series bearing and the flow guide tube series bearing, a first sealing ring at an upper end of the guide wheel series bearing, and/or a second sealing ring between the bearing end cap and the flow guide tube (e.g., to ensure that the lubrication oil remains in the bearings).

In other or further embodiments, the repair push block(s) are configured to extend at least 2-3 mm greater than the pipe diameter (e.g., at least 2-3 mm beyond an outermost surface of the impact housing), thereby enhancing the effect of casing deformation repair.

In other or further embodiments, the MCU may comprise an STM32H743ZI microcontroller (with an operating temperature range of −40° C. to about +105° C.), the camera may comprise a TCM8230 image sensor (which may have an 8-bit parallel DVP interface to transmit image data to the STM32H743ZI microcontroller), the STM32H743ZI microcontroller may have a general purpose input-output (GPIO) with an STM32 (e.g., 32-bit) configuration, and the control unit may further comprise a memory (e.g., a DMA and/or static random access memory, which may be integrated into or separate from the MCU) configured to store image data in frames. The wireless transmission chip may comprise an SX1278 wireless transmitter, and the supplemental light(s) may comprise one or more light-emitting diodes (LEDs). Alternatively or additionally, the wireless transmission chip may be connected to (e.g., in communication with) the MCU through a SPI interface. The MCU may have a central processing unit (CPU) configured for minimal involvement in the memory (e.g., SRAM), for example to achieve efficient acquisition. The wireless transmitter may have low power consumption characteristics to ensure that it can work for a longer period of time.

In still other or further embodiments, the centrifugal block may include a centrifugal block limit, and the turntable may include a hinge seat limit. At a sufficiently high flow of drilling fluid (e.g., when the flow rate of drilling fluid exceeds a first threshold), the turntable rotates at a sufficiently high speed for the centrifugal block limit to cooperate with the hinge seat limit, preventing the centrifugal spring from being overstretched and damaged, and the hinge seat limit is configured to restrict a maximum distance of motion of the centrifugal block to coincide and/or engage with the centrifugal block buckle, thereby achieving power transmission.

In further embodiments, when a flow rate of the drilling fluid is below a second threshold (smaller than the first threshold), the turntable rotates at a sufficiently low speed so that a centrifugal force of the centrifugal block is insufficient to overcome tension of the centrifugal spring, and the centrifugal block does not engage with the centrifugal block buckle. Consequently, power cannot be transmitted to the spline sleeve, and the impact hammer is in an initial position. The drilling fluid passes through the cleaning shaft flow passage(s) and can clean the pipe wall so that the detection unit can collect the pipe wall information. When the flow rate of the drilling fluid increase (e.g., exceeding the first threshold), the rotation speeds of the turbine and the turntable increase, and the centrifugal block exerts a centrifugal force that stretches the centrifugal spring. Under sufficient centrifugal force, the centrifugal block engages with the centrifugal block buckle, transmitting power to the spline sleeve, causing the cam seat to rotate and initiating the operation of the impact hammer.

The pipe wall information collected by the detection unit is sent by the control unit to a ground terminal, and ground personnel can monitor the ground terminal and control operations of the tool by increasing or decreasing the flow of drilling fluid based on the pipe wall information.

In the drawings: 1—Upper joint, 2—Power housing, 3—Guide ring, 4—Guide wheel shaft, 5—Guide wheel, 6—Guide wheel thrust bearing, 7—Turbine, 8—Power shaft, 9—Bearing end cover, 10—Guide tube thrust bearing, 11—Positioning pin, 12—Guide tube, 13—Transmission shaft, 1301—Transmission shaft flow channel, 14—Guide plate, 15—Turntable, 1501—Hinge seat limiter, 16—Centrifugal spring, 17—Centrifugal block, 1701—Spring buckle, 1702—Centrifugal block limiter, 18—ball bearing, 19—Power plate, 1901—Centrifugal block buckle, 20—Spline sleeve, 21—Mandrel, 22—Roller seat, 23—Roller, 24—Cam, 25—Cam seat, 26—Impact housing, 2601—Push block slot, 2602—Impact housing wire hole, 2603—Impact housing flow channel, 27—Thrust ball bearing, 28—Bearing seat, 29—Impact shaft, 30—Control seat, 3001—Control seat wire hole, 31—Impact spring, 32—Control unit, 33—Battery pack, 34—Detection unit, 35—Anti—collision glass, 36—Impact hammer, 37—Push block spring, 38—Repair push block, 39—Cleaning shaft, 3901—Cleaning shaft flow channel.

DETAILED DESCRIPTION OF THE INVENTION

The following is a detailed description of the technical solution(s) of embodiments of the present invention in conjunction with the accompanying figures. These embodiments are merely part of the present invention and do not represent the entirety. Other embodiments derived by those skilled in the art without creative labor based on these embodiments are also within the scope of protection of the present invention.

Figure 1:
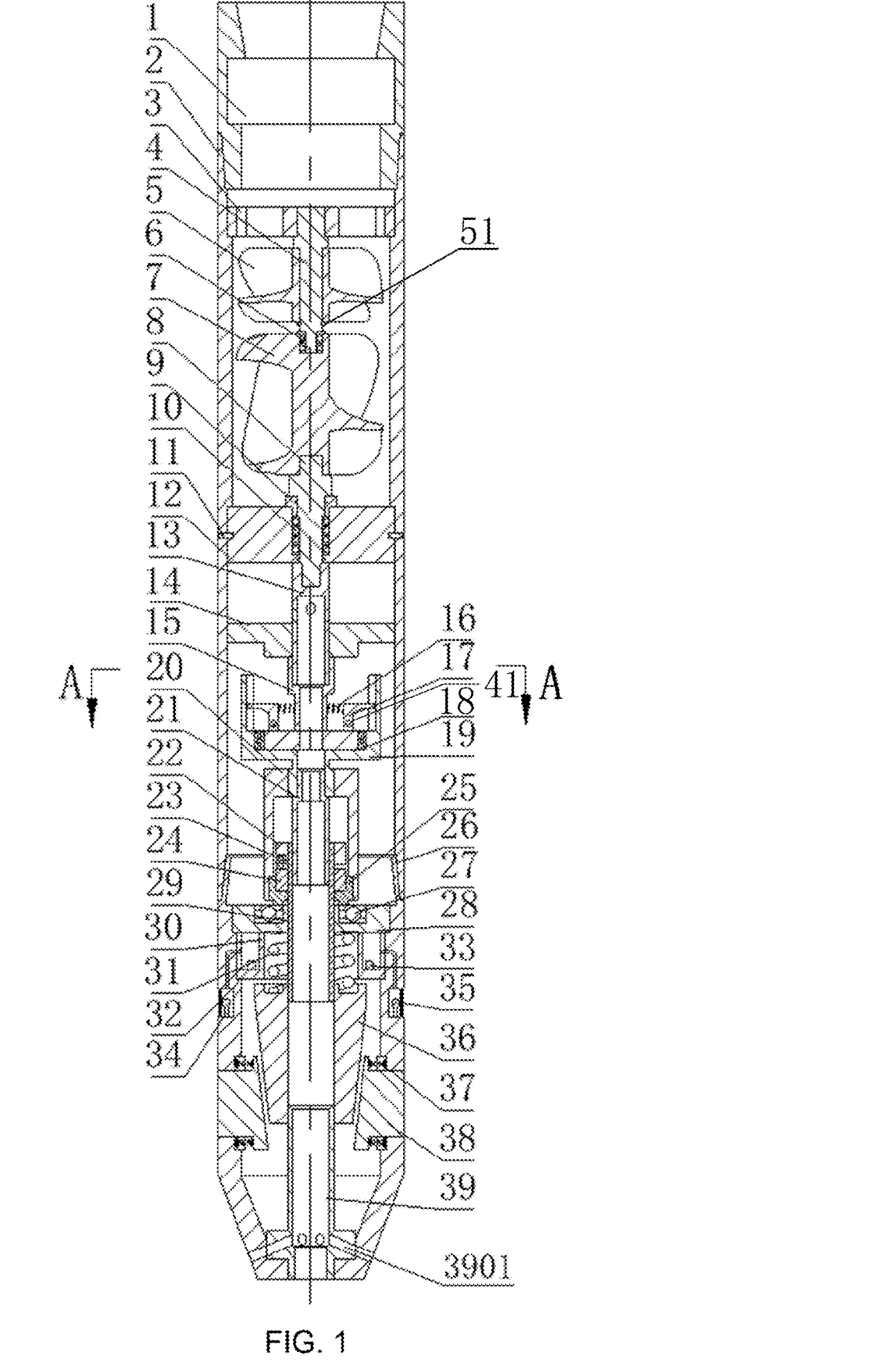
FIG. 1 is a schematic diagram of an exemplary structure of the invention.
Figure 2:
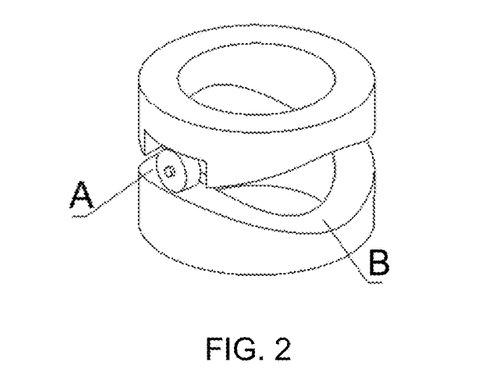
FIG. 2 is an exemplary assembly diagram of the cam, roller, and roller seat.
Figure 3:
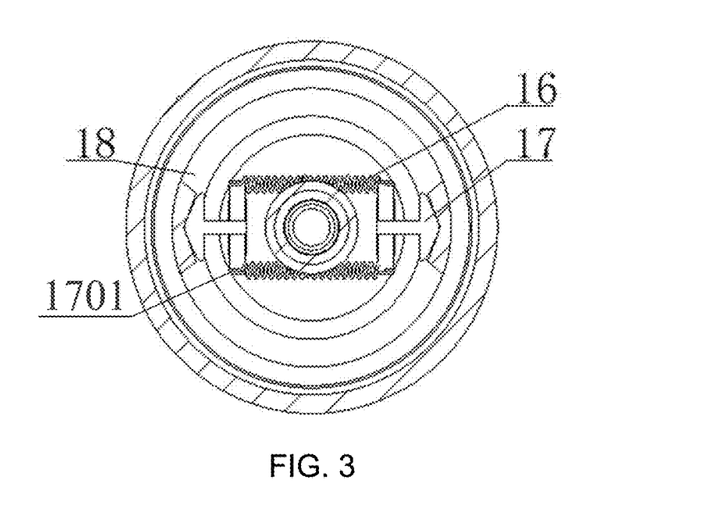
FIG. 3 is a cross-sectional view along section A-A in FIG. 1.

Referring to FIG. 1, an intelligent multi-directional impact drilling accelerator comprises a power module, a repair module, and a detection module.

Figure 4:
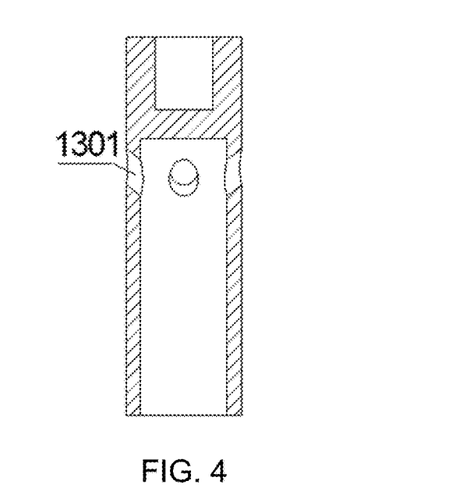
FIG. 4 is a cross-sectional view of an exemplary drive shaft.
Figure 5:
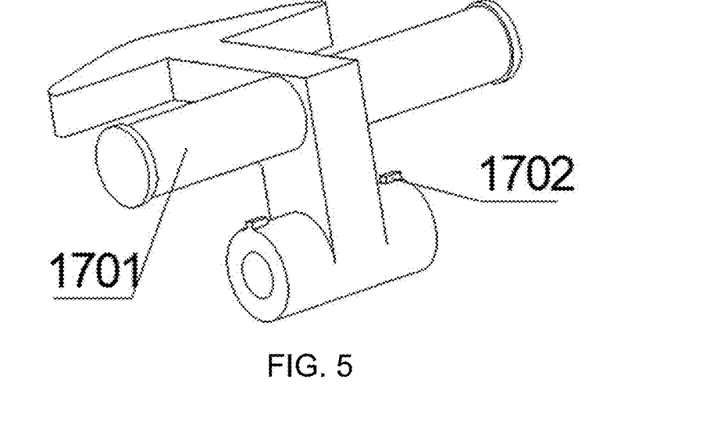
FIG. 5 is an axonometric view of an exemplary centrifugal block.
Figure 6:
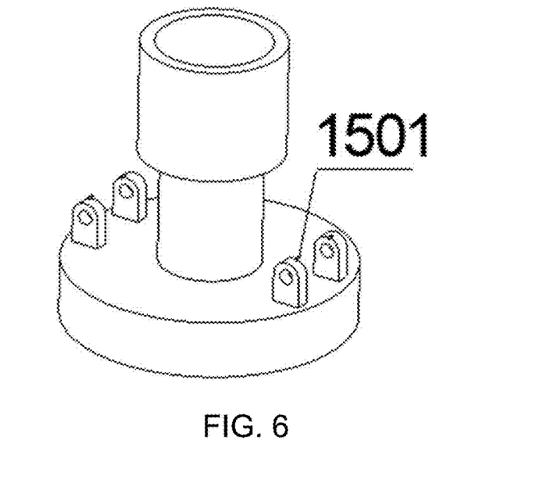
FIG. 6 is an axonometric view of an exemplary turntable.
Figure 7:
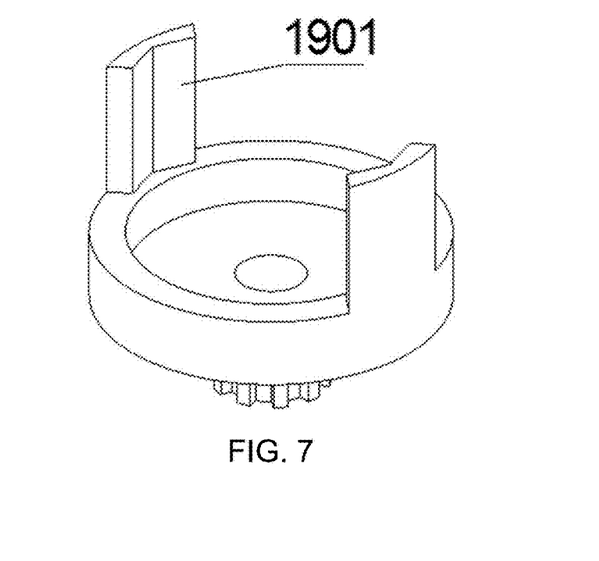
FIG. 7 is an axonometric view of an exemplary power disk.
Figure 8:
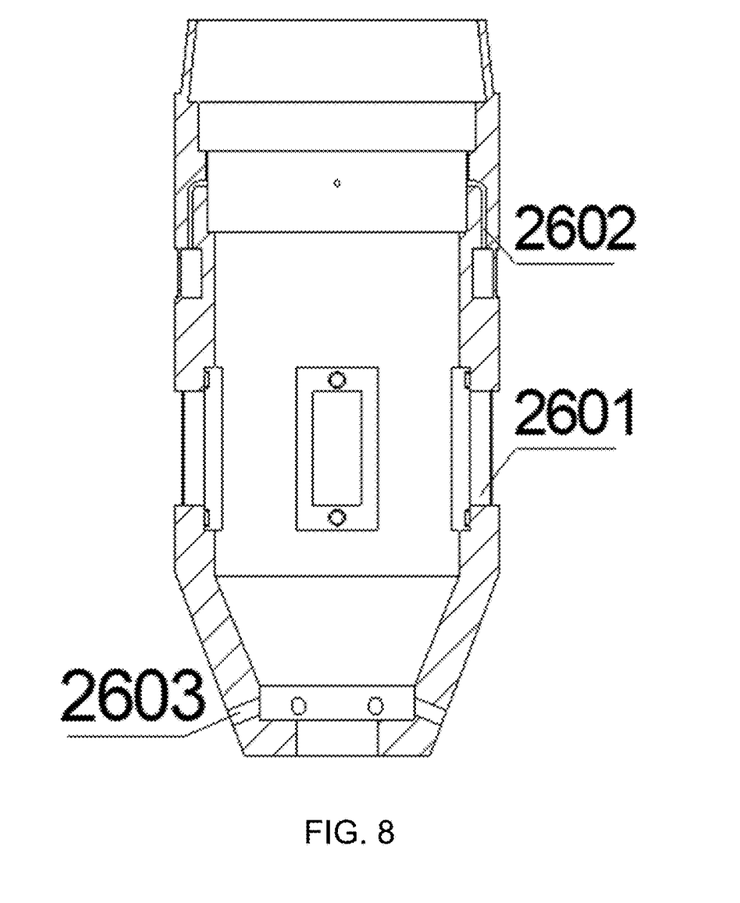
FIG. 8 is a cross-sectional view of an exemplary impact shell.

Referring to FIGS. 1 and 4, the power module includes an upper joint 1, a power housing 2, a flow guide ring 3, a guide wheel shaft 4, a guide wheel 5, a guide wheel series bearing 6, a turbine 7, a power shaft 8, an end cover bearing 9, a flow guide tube series bearing 10, a positioning pin 11, a flow guide tube 12, a transmission shaft 13, and a flow guide plate 14. The upper joint 1 is connected to the power housing 2 via threads (e.g., a threaded or screw-type connector). The flow guide ring 3 is connected to an inner wall of the power housing 2 by threads (e.g., a threaded or screw-type connector), diverting the drilling fluid flowing in from above. The flow guide ring 3, guide wheel shaft 4, and guide wheel 5 are sequentially connected by threads (e.g., threaded or screw-type connectors), and the helical direction of these threads is opposite to the lower turbine 7 (e.g., its direction of rotation). The guide wheel 5 has a lower end that may include or be adjacent to or in contact with a shaft retaining ring 51, which changes the flow trajectory of the drilling fluid. The drilling fluid drives rotation of the turbine 7. The turbine 7 is connected to the lower end of the guide wheel shaft 4, and a guide wheel series bearing 6 is at the connection between the turbine 7 and the guide wheel shaft 4. The power shaft 8 is connected to the lower end of the turbine 7 via a spline, and the flow guide tube 12 is connected to the power housing 2 via the positioning pin 11. Between the flow guide tube 12 and the power shaft 8, an end cover bearing 9 and a flow guide tube series bearing 10 are sequentially installed. The transmission shaft 13 is connected to the lower end of the power shaft 8 by threads (e.g., a threaded or screw-type connector). There is an interference fit between the flow guide plate 14 and the transmission shaft 13, which is positioned axially by the turntable 15. The flow guide plate 14 collects the drilling fluid flowing in from above, allowing it to flow through the transmission shaft flow channel(s) 1301 (FIG. 4) into the transmission shaft 13. The transmission shaft 13 may include four uniformly or radially distributed transmission shaft flow channels 1301 around its circumference.

Referring to FIGS. 1, 2, 3, and 8, the repair module includes the turntable 15, a centrifugal spring 16, a centrifugal block 17, a ball bearing 18, a power disk 19, a spline sleeve 20, a core shaft 21, a roller seat 22, a roller 23, a cam 24, a cam base 25, an impact housing 26, a thrust ball bearing 27, a bearing seat 28, an impact shaft 29, an impact spring 31, an impact hammer 36, a push block spring 37, a repair push block 38, and a cleaning shaft 39. The turntable 15 is connected to the transmission shaft 13 by threads (e.g., a threaded or screw-type connector). The centrifugal block 17 is connected to the surface of the turntable 15 via a hinge seat through a cylindrical pin 41. The centrifugal spring 16 is connected to the surface of the centrifugal block 17 by a spring buckle 1701. The ball bearing 18 is in a deep groove between the power disk 19 and the turntable 15. The power disk 19 has an upper surface equipped with a centrifugal block buckle 1901. The spline sleeve 20 is connected to the power disk 19 and the cam base 25 via splines. The core shaft 21 is connected to the power disk 19 by threads (e.g., a threaded or screw-type connector). The cam 24 is connected to the cam base 25 by threads (e.g., a threaded or screw-type connector). The roller 23 is connected to the roller seat 22 by bolts (e.g., a plurality of bolt-and-nut or bolt-and-threaded hole connectors), and the roller 23 fits with a surface trajectory of the cam 24. The roller seat 22 is connected to the impact shaft 29 by threads (e.g., a threaded or screw-type connector), and the impact housing 26 is connected to the power housing 2 by threads (e.g., a threaded or screw-type connector). The bearing seat 28 is connected to the impact housing 26 by threads (e.g., a threaded or screw-type connector), and the thrust ball bearing 27 is in the bearing seat 28. The thrust ball bearing 27 (e.g., an upper surface thereof) contacts a lower surface of the cam base 25. The impact shaft 29 has a clearance fit with the bearing seat 28. The impact hammer 36 is connected to the impact shaft 29 by threads (e.g., a threaded or screw-type connector), and the impact spring 31 is between the impact hammer 36 and the bearing seat 28. The repair push block 38 is in a push block groove or opening 2601 on the surface of (or in) the impact housing 26. Four repair push blocks 38 are evenly distributed around a circumference of the impact housing 26, and both a surface of the repair push block 38 and an inner wall of the impact housing 26 may be equipped with or may include spring grooves. Each push block spring 37 is between (or in a corresponding spring groove of) the repair push block 38 and a corresponding spring groove in the impact housing 26. Two push block springs 37 may be paired with the same axis, and may be evenly distributed in four groups around the impact housing 26 (e.g., there may be two push block springs 37 for each repair push block 38). The cleaning shaft 39 is connected to the impact housing 26 by threads (e.g., a threaded or screw-type connector), and the cleaning shaft 39 has a clearance fit with the impact hammer 36. The cleaning shaft 39 has a plurality of cleaning flow channels 3901, which may be evenly distributed in six directions (e.g., radially), and the cleaning flow channels 3901 may be aligned with a center of the impact housing flow channel 2603. When the drilling fluid is at a low flow rate, the turntable 15 rotates slowly, and the centrifugal force generated by the centrifugal block 17 is insufficient to overcome the tension of the centrifugal spring 16. The centrifugal block 17 cannot engage with the centrifugal block buckle 1901, and power cannot be transmitted to the spline sleeve 20. The impact hammer 36 is in its initial position, and the drilling fluid, under the influence of the flow guide plate 14, flows into the cleaning shaft 39, exiting through the cleaning flow channel(s) 3901 to clean the pipe wall, facilitating the detection unit 34 in collecting pipe wall information. When the flow rate of the drilling fluid increases, the speed of the turbine 5 rises, leading to an increase in the speed of the turntable 15. At high speeds (e.g., 60 rev/min), the centrifugal force generated by the centrifugal block 17 overcomes the tension of the centrifugal spring 16, allowing the centrifugal block 17 to engage with the centrifugal block buckle 1901, transmitting power to the spline sleeve 20, and causing the cam base 25 to rotate, initiating the operation of the impact hammer 36.

Figure 9:
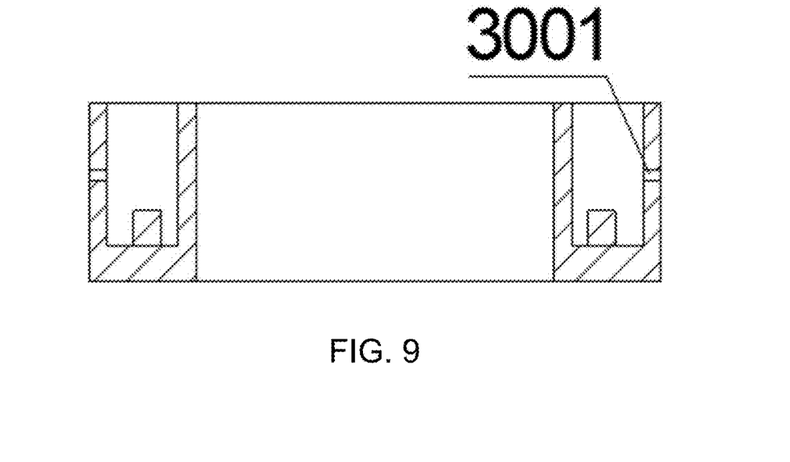
FIG. 9 is a cross-sectional view of an exemplary control seat.
Figure 10:
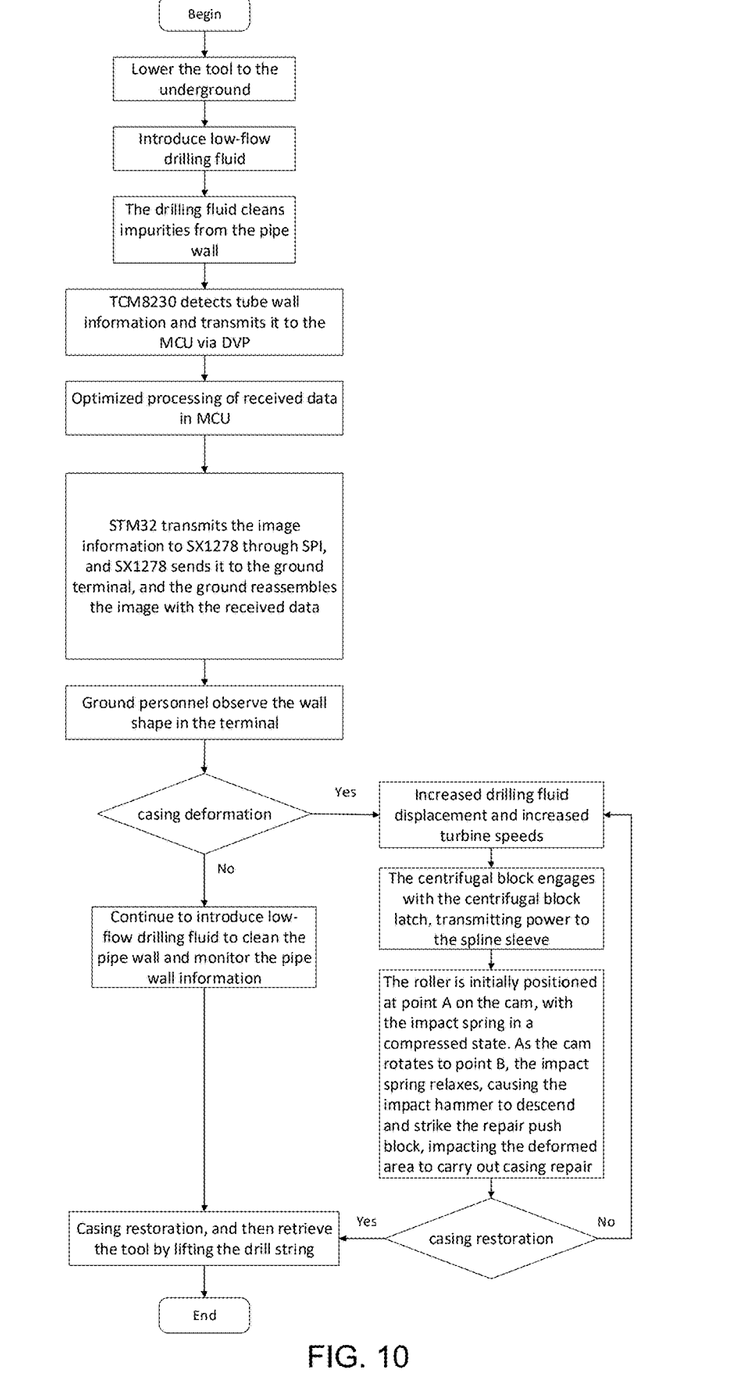
FIG. 10 is an exemplary workflow and control diagram.
Figure 11:
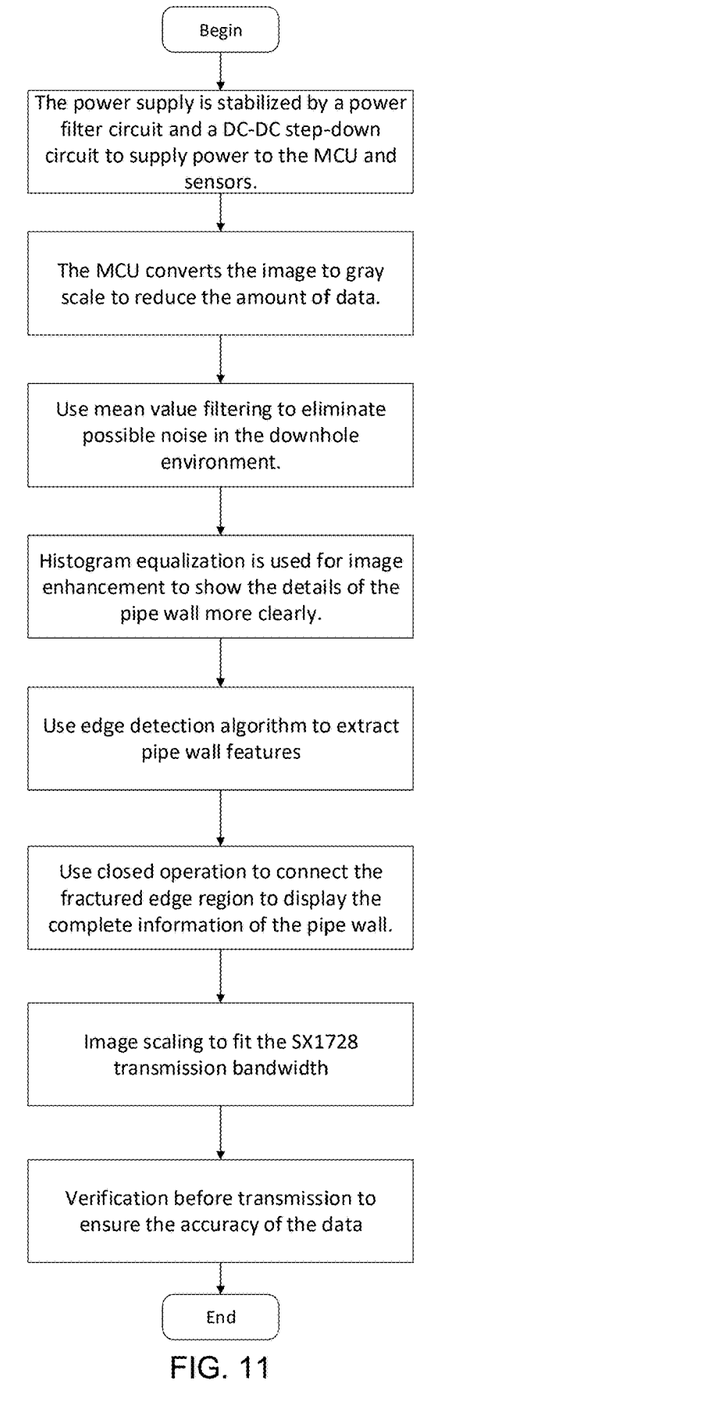
FIG. 11 shows an exemplary flow chart for information processing.

The detection module comprises a control seat 30, a control unit 32, a battery pack 33, a detection unit 34, and a collision proof glass 35. The control seat 30 is connected with the impact shell 26 through a thread (e.g., a threaded or screw-type connector), four control seat wire holes 3001 are uniformly arranged around the control seat 30, and the control seat wire holes 3001 are concentric with the impact shell wire holes 2602. The control unit 32 is connected to control unit 30 through bolts (e.g., a plurality of bolt-and-nut or bolt-and-threaded hole connectors), the control unit 32 contains a microcontroller unit (MCU), a DC-DC step-down circuit, a power filter circuit, a signal filter circuit, a signal amplification circuit, and a wireless signal transmission chip, integrated onto a printed circuit board (PCB). The battery pack 33 is connected to the control seat 30 through bolts (e.g., a plurality of bolt-and-nut or bolt-and-threaded hole connectors), and the battery pack 33 is connected to the control unit 32 through wires. The detection unit 34 is in a notch or recess in the impact housing 26, and the detection unit 34 may comprise four subunits that may be distributed evenly in all directions (e.g., radially). The detection unit 34 (or each subunit) contains a camera and a supplemental (e.g., fill or filler) light, and may be oriented or installed at an angle of 30° from a tool axis (e.g., a central axis of the tool), so that the viewing angle of the camera and a light beam from the supplemental light is directed in front of the repair block 38. The supplemental light may illuminate the tube wall, which is convenient for the camera to collect tube wall information. The detection unit 34 is connected to the control unit 32 and battery pack 33 via a wire that passes through the control base wire hole 3001 and the impact housing wire hole 2602. The anti-collision glass 35 is connected to the impact housing 35 with bolts (e.g., a plurality of bolt-and-nut or bolt-and-threaded hole connectors), and the anti-collision glass 35 may comprise four circumferentially distributed sections (e.g., covering the notch or recess in the impact housing 26). The tube wall information collected by the detection unit 34 is sent to the ground terminal through the control unit 32. The surface operator may controls the operation(s) (or operating status) of the tool by increasing or decreasing the drilling fluid flow rate, based on the pipe wall information.

In one specific embodiment, the tool is lowered into and through the well through the drill string, and the drilling fluid is first passed or shunted through the diversion ring 3 (e.g., at a relatively low flow rate). The drilling fluid strikes the guide wheel 5, which changes the trajectory of the drilling fluid and drives rotation of the turbine 7 to generate power. The turntable 15 also starts to rotate (e.g., as a result of rotation of the guide wheel 5 and/or the turbine 7) at a relatively low speed (e.g., 15 rev/min). At this time, the centrifugal force generated by the centrifugal block 17 is not enough to overcome the pulling force of the centrifugal spring 16. The centrifugal spring 16 is at or substantially at its original length, the centrifugal block 17 does not match or engage with the centrifugal block buckle 1901, power is not transferred to the spline sleeve 20, and the repair block 37 does not extend. The drilling fluid (e.g., under the action of the guide disc 14) may flow through the drive shaft flow channel(s) 1301 into the drive shaft 13, and into the cleaning shaft 39 and through the cleaning shaft flow channel(s) 3901, cleaning pipe wall impurities. It is convenient for the detection unit 34 to collect tube wall information, so the supplemental light may illuminate the tube wall in front of the nose of the tool, and the camera in the detection unit 34 can transmit collected information to the control unit 32. The control unit 32 pre-processes signals (e.g., from the camera[s]) through a signal amplification circuit and a signal filter circuit, and then sends the signal to the ground terminal through a wireless signal transmission chip using software in or accessible by the MCU (e.g., to reduce noise). Ground personnel monitor the current tube wall information (e.g., images of the tube wall from the camera[s] and control unit 32) in real time. When casing deformation is found, the ground personnel may increase the drilling fluid flow rate, increasing the speed of the turbine 7 and the speed of the turntable 15 (e.g., to 60 rev/min or thereabout). At such speeds, the centrifugal force generated by the centrifugal block 17 can overcome the tension of the centrifugal spring 16, and the centrifugal block 17 can engage with the centrifugal block buckle 1901 to transfer the power of the turntable 15 to the spline sleeve 20. The roller 23 is initially located at cam point A (FIG. 2), the impact spring 37 is compressed, the power of spline sleeve 20 is transferred to the cam 24, the cam 24 rotates to point B, the impact spring 37 is released, and the impact hammer 36 impacts the repair push block(s) 38 so that the repair push block(s) 38 extend, and impact the deformation in (or deformed part of) the tube wall. The cam 24 returns or moves back to point A (e.g., 1800 from cam point A in FIG. 2), and the impact hammer 36 reciprocates to repair or return the repair push block(s) 38 to their original position. During casing repair work, the camera detects the tube wall shape in real time, and the control unit 32 transmits the information (e.g., images or video) to the surface. If the ground personnel at the surface think that the wall shape is acceptable, they can choose to reduce the drilling fluid flow, find the next deformation location, or lift the drill string recovery tool.

The invention claimed is:

1. An intelligent impact casing shaping tool, comprising a power module, a repair module, and a detection module; wherein:
    the power module includes an upper connector, a power housing, a flow guide ring, a guide wheel shaft, a guide wheel, a guide wheel series bearing, a turbine, a power shaft, a bearing end cap, a flow guide tube series bearing, a positioning pin, a flow guide tube, a transmission shaft, and a flow guide plate;

the upper connector is connected to the power housing by threading;

the flow guide ring is connected to the power housing by threading;

the flow guide ring, the guide wheel shaft, and the guide wheel are threaded together;

the guide wheel has a lower end with a position determined by a shaft retaining ring;

the guide wheel changes a flow trajectory of a drilling fluid;

the drilling fluid drives rotation of the turbine, the turbine is connected to a lower end of the guide wheel shaft;

the guide wheel series bearing is at a connection point between the turbine and the guide wheel shaft;

the power shaft is connected to the lower end of the turbine by a spline, the flow guide tube is connected to the power housing by the positioning pin;

the bearing end cap and the flow guide tube series bearing are between the flow guide tube and the power shaft;

the transmission shaft is connected to a lower end of the power shaft by threading;

the flow guide plate and the transmission shaft have an interference fit;

the flow guide plate allows the drilling fluid to flow into the transmission shaft through a transmission shaft flow passage;

the repair module includes a turntable, a centrifugal spring, a centrifugal block, a ball bearing, a power plate, a spline sleeve, a core shaft, a roller seat, a roller, a cam, a cam seat, an impact housing, a thrust ball bearing, a bearing seat, an impact shaft, an impact spring, an impact hammer, a push block spring, a repair push block, and a cleaning shaft;

the turntable is connected to the transmission shaft by threading, and the centrifugal block is connected to the turntable by a cylindrical pin;

the centrifugal spring is connected to the centrifugal block by a spring buckle;

the ball bearing is between the power plate and the turntable;

the power plate includes a centrifugal block buckle;

the spline sleeve is connected to the power plate and the cam seat by a spline;

the core shaft is connected to the power plate by threading, and the cam is connected to the cam seat by threading;

the roller is connected to the roller seat by bolts, and the roller has a surface trajectory that matches with the cam;

the roller seat is connected to the impact shaft by threading, and the impact housing is connected to the power housing by threading;

the bearing seat is connected to the impact housing by threading, and the thrust ball bearing is in the bearing seat;

the thrust ball bearing contacts a lower surface of the cam seat;

the impact hammer is connected to the impact shaft by threading, and the impact spring is between the impact hammer and the bearing seat;

the repair push block is in a push block groove or opening in the impact housing, the repair push block and/or the impact housing have one or more spring grooves, and the push block spring is in or between the repair push block, the impact housing, and/or the one or more spring grooves;

the cleaning shaft is connected to the impact housing by threading, and the cleaning shaft and the impact hammer have a clearance fit between them;

the cleaning shaft has one or more cleaning flow passages aligned with a flow passage in the impact housing;

the detection module includes a control seat, a control unit, a battery pack, a detection unit, and anti-collision glass;

the control seat is connected to the impact housing by threading;

the control unit is connected to the control seat by bolts and includes a microcontroller unit (MCU) and a wireless signal transmission chip;

the battery pack is connected to the control seat by bolts and is linked to the control unit by wires;

the detection unit is in a slot or recess in the impact housing;

the detection unit includes a camera and a supplemental light, the camera being configured to have a viewpoint in front or at a front end of the repair push block;

the supplemental light is configured to illuminate a pipe wall and/or facilitate collection of pipe wall information by the camera;

the detection unit connects to the control unit through wires; and the anti-collision glass is connected to the impact housing by bolts.

2. The intelligent impact casing shaping tool according to claim 1, further comprising lubrication oil between the guide wheel series bearing and the flow guide tube series bearing, a first sealing ring at an upper end of the guide wheel series bearing, and a second sealing ring between the bearing end cap and the flow guide tube.

3. The intelligent impact casing shaping tool according to claim 1, wherein the repair push block is configured to extend at least 2 mm greater than a pipe diameter.

4. The intelligent impact casing shaping tool according to claim 1, wherein the MCU comprises an STM32H743ZI microcontroller, the camera comprises a TCM8230 image sensor, the wireless transmission chip comprises an SX1278 wireless transmitter, and the supplemental light comprises one or more light-emitting diodes (LEDs).

5. The intelligent impact casing shaping tool according to claim 1, wherein the centrifugal block includes a centrifugal block limit, the turntable includes a hinge seat limit; at a sufficiently high flow of drilling fluid, the turntable rotates at a sufficiently high speed for the centrifugal block limit to cooperate with the hinge seat limit, preventing the centrifugal spring from being overstretched, and the hinge seat limit is configured to restrict a maximum distance of motion of the centrifugal block to coincide and/or engage with the centrifugal block buckle.

6. The intelligent impact casing shaping tool according to claim 5, wherein when a flow rate of the drilling fluid is below a second threshold smaller than the first threshold, the turntable rotates at a sufficiently low speed so that a centrifugal force of the centrifugal block is insufficient to overcome tension of the centrifugal spring, and the centrifugal block does not engage with the centrifugal block buckle, the impact hammer is in an initial position, and the drilling fluid passes through the cleaning shaft flow passage; when the flow rate of the drilling fluid increases, rotation speeds of the turbine and the turntable increase, the centrifugal block stretches the centrifugal spring and engages with the centrifugal block buckle, transmitting power to the spline sleeve, causing the cam seat to rotate and initiating operation of the impact hammer.

7. The intelligent impact casing shaping tool according to claim 1, wherein the flow guide ring diverts drilling fluid flowing into the intelligent impact casing shaping tool.

8. The intelligent impact casing shaping tool according to claim 1, wherein threads on the flow guide ring, the guide wheel shaft, and the guide wheel have a helical direction opposite to a rotation direction of the turbine.

9. The intelligent impact casing shaping tool according to claim 1, wherein the turntable determines an axial position of the flow guide plate.

10. The intelligent impact casing shaping tool according to claim 1, comprising four of the transmission shaft flow passages, uniformly distributed around the transmission shaft.

11. The intelligent impact casing shaping tool according to claim 1, wherein the centrifugal block is connected to the surface of the turntable hinge seat by a cylindrical pin.

12. The intelligent impact casing shaping tool according to claim 1, wherein the power plate has an upper surface, and the centrifugal block buckle is on the upper surface of the power plate.

13. The intelligent impact casing shaping tool according to claim 1, wherein the impact shaft and the bearing seat have a clearance fit between them.

14. The intelligent impact casing shaping tool according to claim 1, wherein the spring grooves are in a surface of the repair push block and in an inner wall of the impact housing, and the push block spring is in or between the spring groove of the repair push block and the spring groove of the impact housing.

15. The intelligent impact casing shaping tool according to claim 14, comprising two of the push block springs in a group, and four groups of the push block springs are uniformly distributed around the impact housing.

16. The intelligent impact casing shaping tool according to claim 1, wherein the cleaning shaft has six uniformly distributed channels or cleaning flow passages, aligned with a flow passage of or in the impact housing.

17. The intelligent impact casing shaping tool according to claim 1, further comprising four control seat wire holes uniformly arranged around the control seat, co-axial with wire holes in the impact housing, and the detection unit connects to the control unit through wires via the control seat wire holes and the impact housing wire holes.

18. The intelligent impact casing shaping tool according to claim 1, wherein the control unit further comprises a DC-DC buck circuit, a power filtering circuit, a signal filtering circuit, and a signal amplification circuit, integrated on a printed circuit board (PCB) with the MCU and the wireless signal transmission chip.

19. The intelligent impact casing shaping tool according to claim 1, comprising four of the detection units in four corresponding ones of the slots or recesses, covered by four corresponding sections of the anti-collision glass, uniformly distributed around the impact housing.

20. The intelligent impact casing shaping tool according to B claim 1, further comprising a camera and a supplemental light at an angle of 30° with respect to a central axis of the tool.

* * * * *